United States Patent
Auvenshine et al.

(10) Patent No.: US 10,423,785 B2
(45) Date of Patent: Sep. 24, 2019

(54) DATA SCANNING WITHIN DISTRIBUTED COMPUTING COMPONENTS

(71) Applicant: INTERNATIONAL BUSINESS MACHINES CORPORATION, Armonk, NY (US)

(72) Inventors: John J. Auvenshine, Tucson, AZ (US); Anthony J. Ciaravella, Tucson, AZ (US); John T. Olson, Tucson, AZ (US); Richard A. Welp, Manchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 121 days.

(21) Appl. No.: 15/175,665

(22) Filed: Jun. 7, 2016

(65) Prior Publication Data
US 2017/0351857 A1    Dec. 7, 2017

(51) Int. Cl.
G06F 21/56    (2013.01)

(52) U.S. Cl.
CPC .......... G06F 21/562 (2013.01); G06F 21/567 (2013.01); *G06F 2221/034* (2013.01)

(58) Field of Classification Search
CPC ............ G06F 21/562; G06F 2221/034; G06F 2212/312; G06F 3/0601; G06F 3/067; G06F 11/3034; H04L 2012/40215
USPC .......................................................... 726/5
See application file for complete search history.

(56) References Cited

U.S. PATENT DOCUMENTS

| | | | |
|---|---|---|---|
| 8,839,436 B2 | 9/2014 | Zeng et al. | |
| 8,843,921 B1* | 9/2014 | Protassov | G06F 9/44505 717/178 |
| 9,129,086 B2 | 9/2015 | Betz et al. | |
| 2008/0148403 A1* | 6/2008 | Manion | G06F 21/56 726/22 |
| 2012/0150925 A1 | 6/2012 | Gupta et al. | |
| 2013/0152200 A1 | 6/2013 | Alme et al. | |
| 2013/0160126 A1 | 6/2013 | Kapoor et al. | |
| 2014/0006357 A1* | 1/2014 | Davis | G06F 11/1464 707/667 |
| 2015/0020203 A1 | 1/2015 | Xie et al. | |
| 2015/0235044 A1* | 8/2015 | Cohen | G06F 21/53 726/17 |

OTHER PUBLICATIONS

Huang et al., "Mobile Cloud Computing Service Models: A User-Centric Approach," IEEE Network, Sep./ Oct. 2013 (6 pages).
Hwang et al., "Trusted Cloud Computing with Secure Resources and Data Coloring," IEEE Internet Computing, 2010 (9 pages).

* cited by examiner

Primary Examiner — Ashokkumar B Patel
Assistant Examiner — William B Jones
(74) Attorney, Agent, or Firm — Griffiths & Seaton PLLC

(57) ABSTRACT

Embodiments for scanning data within and between distributed computing components by a processor. Data scanning functionality is allocated through an object storlet located at a local node of the distributed computing components. The data scanning functionality is performed using computational components of the object storlet on local data contained within the local node to alleviate transfer of the local data outside of the local node to be scanned.

12 Claims, 7 Drawing Sheets

DATA SCANNING WITHIN DISTRIBUTED COMPUTING COMPONENTS

BACKGROUND OF THE INVENTION

Field of the Invention

The present invention relates in general computing systems, and more particularly to, various embodiments for data scanning within and/or between distributed computing components.

Description of the Related Art

In recent years, the storage and management of data has shifted dramatically from a local computing location, such as a personal computer or workstation, to centralized systems that may be distributed globally across a wide variety of locations. Hosted, so-called "cloud" data management has become increasingly popular due to a variety of reasons, such as the redundancy of data, the ease of management and lower capital cost of not having to procure storage infrastructure, and other factors.

SUMMARY OF THE INVENTION

Various embodiments for scanning data within and between distributed computing components by a processor are provided. In one embodiment, by way of example only, a method for scanning data within and between distributed computing components by a processor is provided. Data scanning functionality is allocated through an object storlet located at a local node of the distributed computing components. The data scanning functionality is performed using computational components of the object storlet on local data contained within the local node to alleviate transfer of the local data outside of the local node to be scanned.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
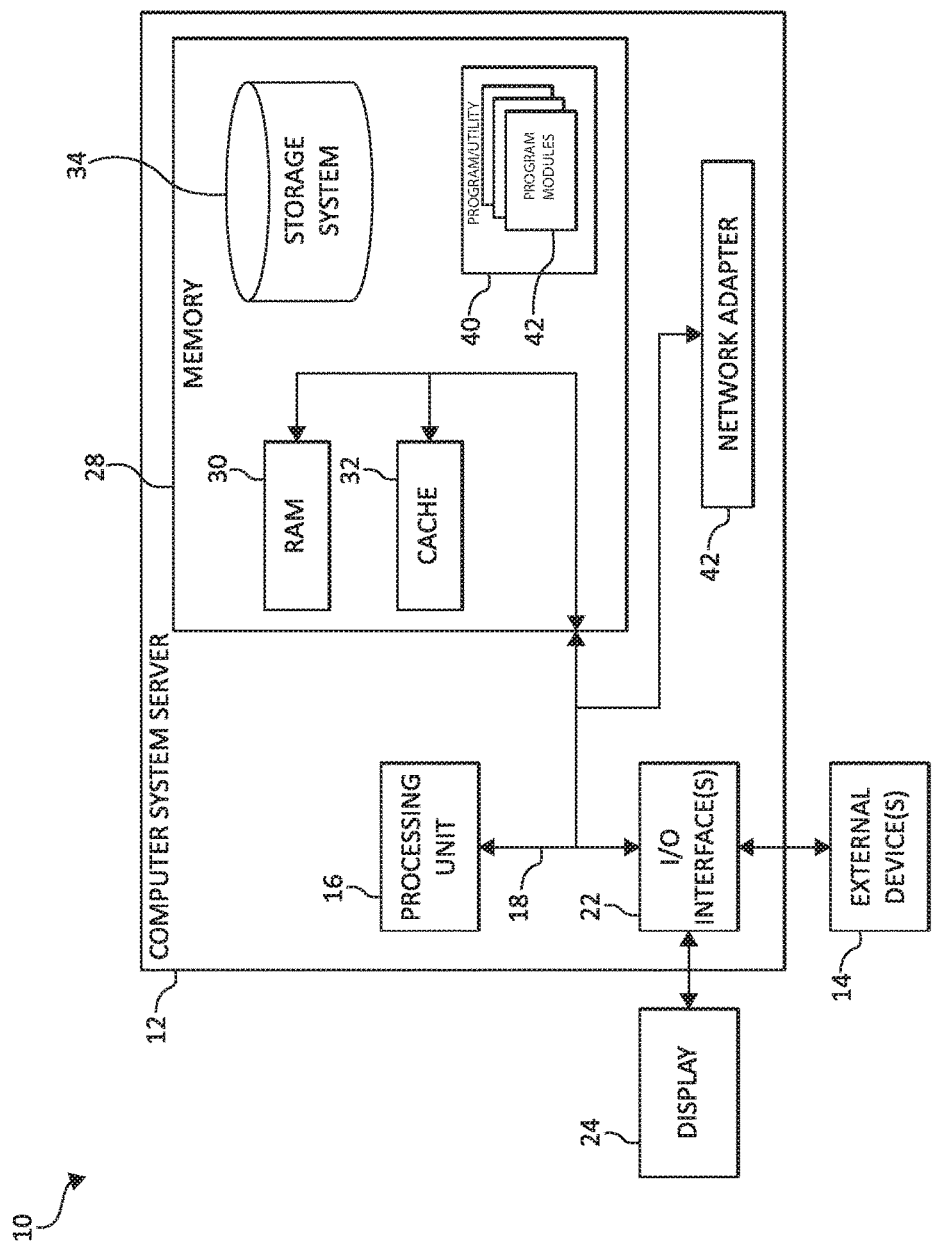
FIG. 1 is a block diagram depicting an exemplary cloud computing node according to an embodiment of the present invention.

As previously indicated, data is increasingly processed through a variety of geographically disbursed computing components, where, for example, a local node may contain a set of data processing components yet remain in remote communication with other portions of the distributed data processing system. To wit, a user's data may not be locally stored or processed on the user's local computer, but is instead hosted by one or more distributed storage components that are in remote communication with the local computer. This type of data storage may, in some cases, be referred to as "cloud," or "cloud-based" storage.

Typically, data processing that involves antivirus and anti-malware data scanning and processing operations that involve cloud and cloud-based systems are required to interface with scanning engines outside of the instant cloud system, which may slow down access to data, and may further require multiple data transfers to possibly scan and correct a given data file.

In view of the foregoing, a need exists for a mechanism whereby data scanning operations conducted pursuant to antivirus, anti-malware, and other data examination functionality to ensure data safety is more efficiently performed in a distributed computing environment such as a cloud-based storage system.

The mechanisms of the illustrated embodiments implement the use of object storlets, as will be further described, among other functionality, to perform data scanning operations (such as antivirus and anti-malware operations) within a distributed computing environment (i.e., within a cloud-based storage system) to prevent the unnecessary transfer of data, both between the distributed components and external scan engines, and within components (such as storage servers) within the distributed environment. Accordingly, as objects are accessed through either storage, retrieval, or replication operations (among other methods), the objects may be scanned through storlets contained within the distributed computing components themselves.

In an alternative embodiment, the data scanning storlets at a particular node in the distributed computing environment may share a common set of definitional information to minimize storage space and external Input/Output (I/O) traffic associated with the definitional information. For example, in the case of antivirus functionality, a cloud-based storage system may share (between distributed computing components) a common set of antivirus definitions. Moreover, the definitional information may specifically be tailored to various aspects, such as geographic locations, types of data, data security, and a variety of other factors that are specific to a particular node or group of local nodes to suit a particular application. This definitional information may be shared across an entire environment, or specified nodes as the case may warrant.

Implementation of storlets to perform data scanning functionality, among other various aspects of the illustrated embodiments, may convey certain attendant benefits. For example, differing storlets from a wide variety of vendors may be uploaded to one or more local nodes in the distributed computing environment. For a particular data object to be scanned, no transfer of data outside the local node is required (e.g., the data scanning is performed locally through the storlet). In addition, pairing storlets with storage systems in a distributed computing environment allows a particular object to potentially be scanned any time the object is stored (e.g., allows for scanning during replication between local nodes).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
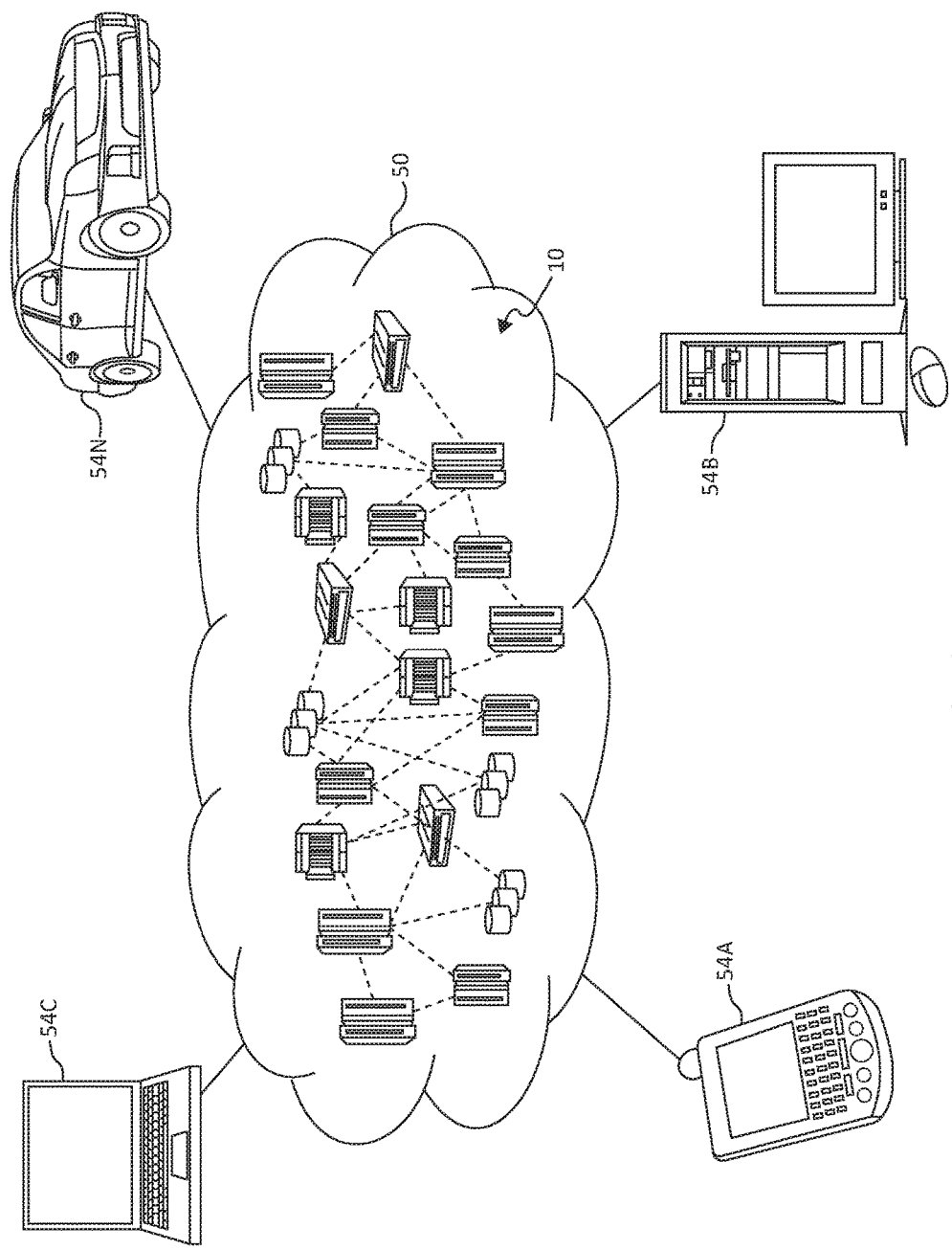
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
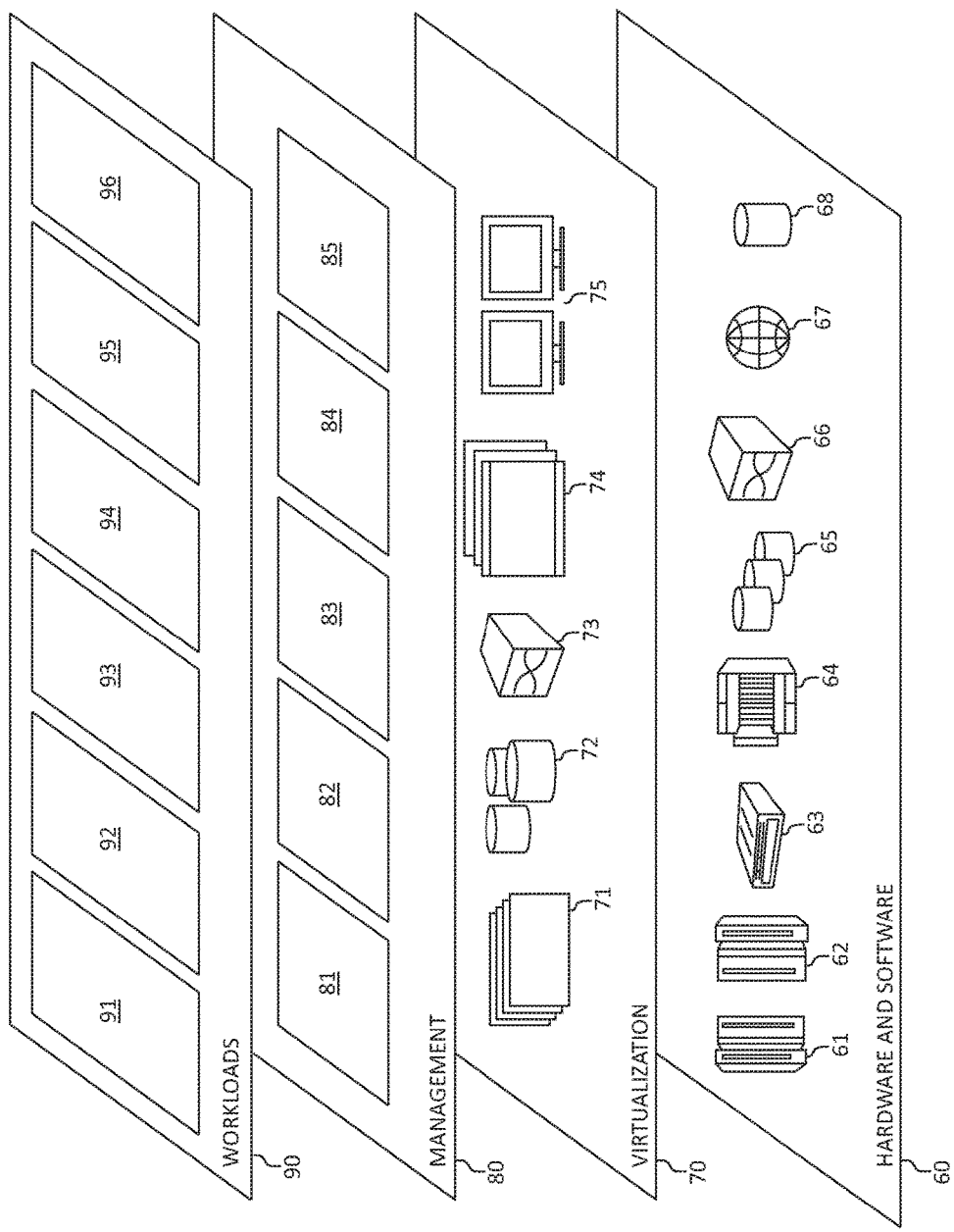
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various data security workloads and functions 95, such as antivirus scanning workloads, or anti-malware scanning workloads. In addition, data security workloads and functions 95 may include such operations as data quarantining and/or data deleting functions. One of ordinary skill in the art will appreciate that the data security workloads and functions 95 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
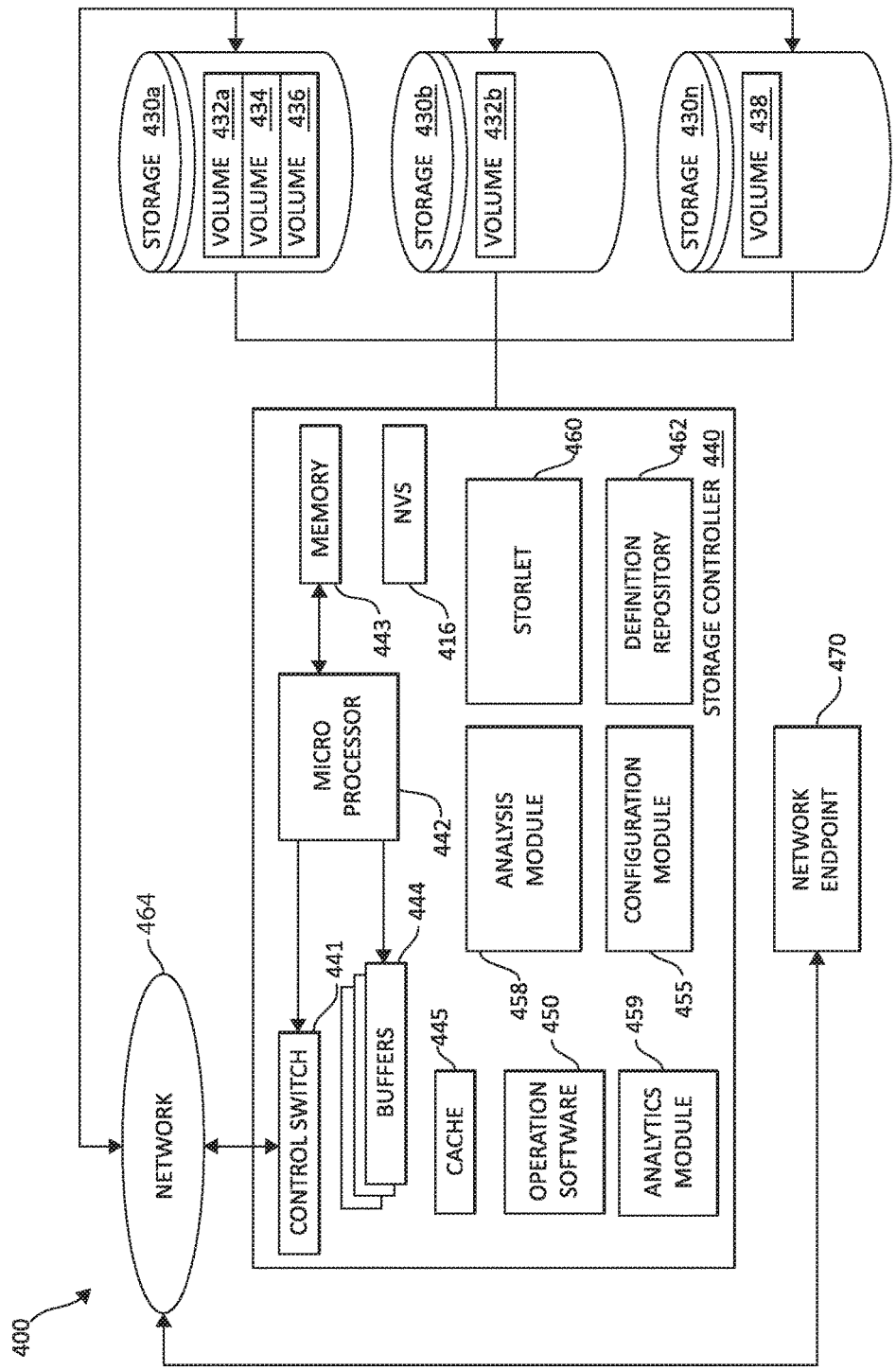
FIG. 4 is an additional block diagram depicting an exemplary hardware structure for scanning data within and between distributed computing components by a processor, in which aspects of the present invention may be realized.

FIG. 4, following, is an additional block diagram showing a hardware structure of a data management system 400 that may be used in the overall context (i.e., as a portion of a distributed computing environment) of performing functionality according to various aspects of the present invention.

Network 464 may be a fibre channel (FC) fabric, a fibre channel point-to-point link, a fibre channel over Ethernet (FCoE) fabric or point to point link, a Fibre Connection (FICON®) or Enterprise Systems Connection (ESCON) I/O interface, any other I/O interface type, a wireless network, a wired network, a LAN, a WAN, heterogeneous, homogeneous, public (i.e. the Internet), private, or any combination thereof. The ISP may provide local or distributed data among one or more locations and may be equipped with any type of fabric (or fabric channel) (not shown in FIG. 4) or network adapter (not shown in FIG. 4) to the storage controller 440, such as Fibre channel, FICON®, ESCON, Ethernet, fiber optic, wireless, or coaxial adapters. Network management system 400 is accordingly equipped with a suitable fabric (not shown in FIG. 4) or network adaptor to communicate.

To facilitate a clearer understanding of the methods described herein, storage controller 440 is shown in FIG. 4 as a single processing unit, including a microprocessor 442, system memory 443 and nonvolatile storage ("NVS") 416. It is noted that in some embodiments, storage controller 440 is comprised of multiple processing units, each with their own processor complex and system memory, and interconnected by a dedicated network 460 within data storage system 400.

In a local or remote location, yet connected over network 464, storage 430 (labeled as 430a, 430b, and 430n herein) may be comprised of one or more storage devices, such as storage arrays, which are connected to storage controller 440 (e.g., by a storage network) as shown.

In some embodiments, the devices included in storage 430 may be connected in a loop architecture. Storage controller 440 manages storage 430 and facilitates the processing of write and read requests intended for storage 430. The system memory 443 of storage controller 440 stores program instructions and data, which the processor 442 may access for executing functions and method steps of the present invention for executing and managing storage 430 as described herein. In one embodiment, system memory 443 includes, is in association with, or is in communication with the operation software 450 for performing methods and operations described herein. As shown in FIG. 4, system memory 443 may also include or be in communication with a cache 445 for storage 430, also referred to herein as a "cache memory," for buffering "write data" and "read data," which respectively refer to write/read requests and their associated data. In one embodiment, cache 445 is allocated in a device external to system memory 443, yet remains accessible by microprocessor 442 and may serve to provide additional security against data loss, in addition to carrying out the operations as described herein.

In some embodiments, cache 445 is implemented with a volatile memory and non-volatile memory and coupled to microprocessor 442 via a local bus (not shown in FIG. 4) for enhanced performance of data storage system 400. The NVS 416 included in data storage controller 440 is accessible by microprocessor 442 and serves to provide additional support for operations and execution of the present invention as described in other figures. The NVS 416, may also be referred to as a "persistent" cache, or "cache memory" and is implemented with nonvolatile memory that may or may not utilize external power to retain data stored therein. The NVS 416 may be stored in and with the cache 445 for any purposes suited to accomplish the objectives of the present invention. In some embodiments, a backup power source (not shown in FIG. 4), such as a battery, supplies NVS 416 with sufficient power to retain the data stored therein in case of power loss to data storage system 400. In certain embodiments, the capacity of NVS 416 is less than or equal to the total capacity of cache 445.

Storage 430 may be physically comprised of one or more storage devices, such as storage arrays. A storage array is a logical grouping of individual storage devices, such as a hard disk. In certain embodiments, storage 430 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 4 may include a logical volume, or simply "volume," may have different kinds of allocations. Storage 430a, 430b and 430n are shown as ranks in data storage system 400, and are referred to herein as rank 430a, 430b and 430n. Ranks may be local to data storage system 200, or may be located at a physically remote location. In other words, a local storage controller may connect with a remote storage controller and manage storage at the remote location. Rank 430a is shown configured with two entire volumes, 434 and 436, as well as one partial volume 432a. Rank 430b is shown with another partial volume 432b. Thus volume 432 is allocated across ranks 430a and 430b. Rank 430n is shown as being fully allocated to volume 438—that is, rank 430n refers to the entire physical storage for volume 438. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

A network endpoint 470 is connected through the network 464 as shown. The network endpoint 470 is generically intended to refer to any number of network devices, such as a switch, a router, a wireless access point, or another device known generally to one of ordinary skill in the art. As will be further illustrated in the following figures, a user may use a networked device, (e.g., a device connected to network 464) to access the network 464. The networked device may include computers, tablets, smartphones, television set top boxes, televisions and other video equipment, or even a household appliance such as a refrigerator or a garage door opener, again as one of ordinary skill in the art will appreciate. Ultimately any device having communicative ability to and through network 464 is anticipated to use the network endpoint 470. In one embodiment, the depiction of a network endpoint 470 serves to provide a point where an input object (data object) is introduced into a distributed computing environment, as will be described.

The storage controller 440 may include a configuration module 455, an analysis module 458, a storlet 460, and one or more definitional repositories 462 (e.g., tables of antivirus definitional entries) for various entries, among other functional components. The configuration module 455, analysis module 458, storlet 460, and definitional repositories 462 may operate in conjunction with each and every component of the storage controller 440, and storage devices 430. The configuration module 455, analysis module 458, storlet 460, and definitional repositories 462 may be structurally one complete module or may be associated and/or included with other individual modules. The configuration module 455, analysis module 458, storlet 460, and definitional repositories 462 may also be located at least partially in the cache 445 or other components, as one of ordinary skill in the art will appreciate.

The configuration module 455, analysis module 458, storlet 460, and definitional repositories 462 may individually and/or collectively perform various aspects of the present invention as will be further described. For example, the configuration module 455 may perform various system configuration operations in accordance with aspects of the illustrated embodiments, such as configuring the storage controller 440 to operate using a given set of definitional information, for example. The analysis module 458 may use data analytics to identify, organize, create, delete, sequester, or perform other actions on various patterns, trends, and other characteristics identified in the tracked and scanned data over the network 464 and between other distributed computing components in a distributed computing environment. Storlet module 460 may perform various data scanning and related data analysis and security operations, such as antiviral data scanning functionality, anti-malware data scanning functionality, data sequestering, movement, identification, and so forth. Finally, each of the various definitional entries, may be stored, organized, retrieved, and deleted in the definitional repositories 462. As one of ordinary skill in the art will appreciate, the configuration module 455, analysis module 458, storlet 460, and definitional repositories 462 may make up only a subset of various functional and/or functionally responsible entities in the data storage system 400.

Other ancillary hardware may be associated with the storage system 400. For example, as shown, the storage controller 440 includes a control switch 441, a microprocessor 442 for controlling all the storage controller 440, a nonvolatile control memory 443 for storing a microprogram (operation software) 450 for controlling the operation of storage controller 440, data for control, cache 445 for temporarily storing (buffering) data, and buffers 444 for assisting the cache 445 to read and write data, a control switch 441 for controlling a protocol to control data transfer to or from the storage devices 430, the configuration module 455, analysis module 458, storlet 460, definitional repositories 462, or other blocks of functionality, in which information may be set. Multiple buffers 444 may be implemented with the present invention to assist with the operations as described herein.

Figure 5A:
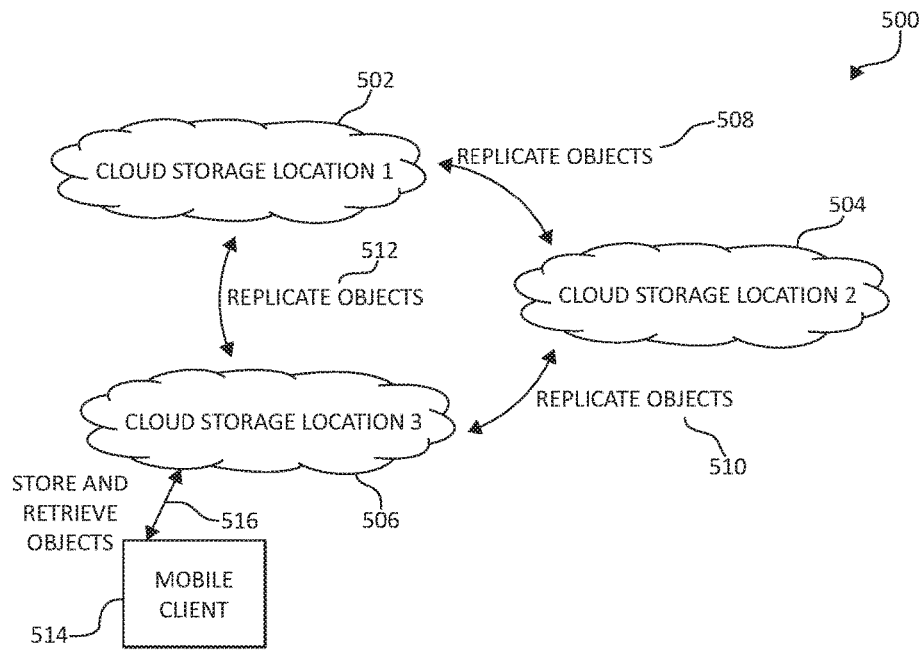
FIG. 5A is an additional block diagram depicting portions of distributed computing nodes in which data is processed, again in which aspects of the present invention may be realized.

Turning now to FIG. 5A, an additional block diagram of a globally dispersed cloud network 500 is shown in which aspects of the illustrated embodiments may be implemented. Network 500 incorporates a number of exemplary cloud storage locations (e.g., cloud storage location 1, cloud storage location 2, cloud storage location 3) here designated with 502, 504, and 506, that serve to process data in one form or another.

As shown, a mobile client 514 (such as the aforementioned smartphone 514 or PDA 514) is in communication with the network 500 to perform such data management functionality as cloud-based storage and retrieval of data objects designated by arrow 516. The data objects may then be shared between the cloud storage locations 502, 504, and 506, such as through data replication operations as shown (designated here by replicate objects 508, 510, and 512). One of ordinary skill in the art will appreciate that the functionality depicted in network 500 is only but a subset of the possible functionality that may be provided by the cloud network in conveying, organizing, processing, storing, and otherwise accommodating data objects.

Figure 5B:
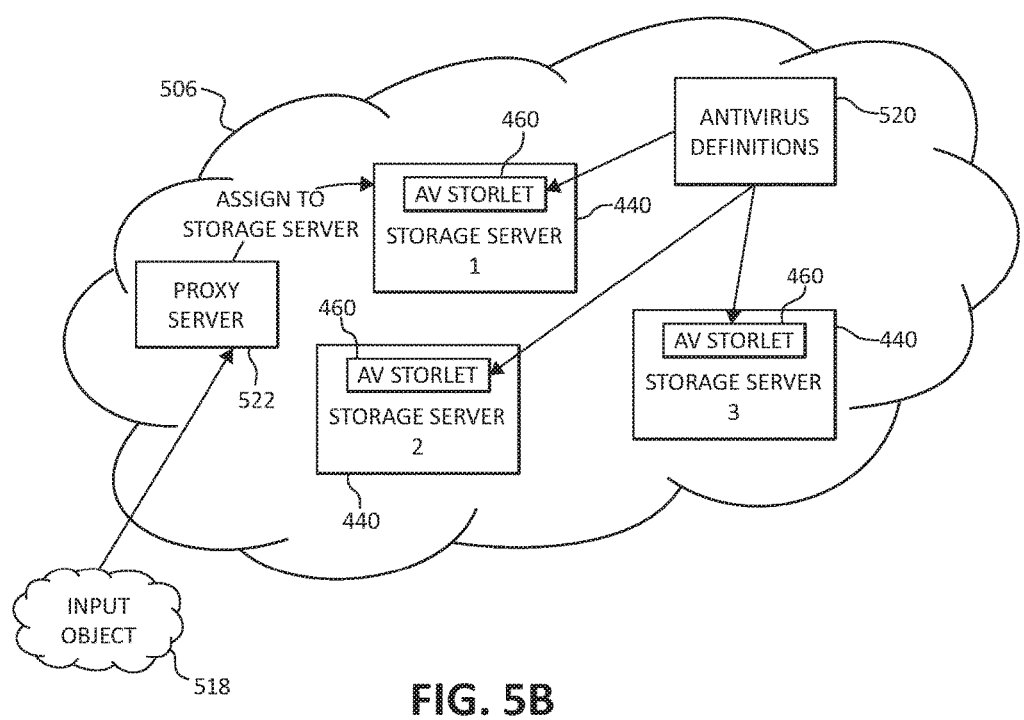
FIG. 5B is an additional block diagram of one of the distributed computing nodes shown in FIG. 5A, previously, depicting an exemplary configuration of data storage and processing devices, in accordance with various aspects of the present invention.

FIG. 5B, following, is an additional block diagram of an expanded view of the cloud storage location 506 to depict additional specific functionality afforded by the various aspects of the illustrated embodiments. Again as one of ordinary skill in the art will appreciate, a wide variety of computing components may be incorporated, logically and/or physically, into the cloud storage location 506; however, for purposes of the present discussion, a number of storage servers 440 are seen incorporating storlets 460, for performing specific data processing functionality according to various aspects of the mechanisms of the present invention. In the present depiction, the storlets 460 are configured as "antivirus storlets" 460 or "AV storlets" 460 as shown.

FIG. 5B also shows an exemplary process of data scanning/data management/data processing functionality, as an input data object 518 is first received by the proxy server 522 in the cloud storage location 506. The input data object 518 is then assigned/sent to one of the storage servers 440 as shown (again, all of the storage servers 440 contain AV storlets 460). Moreover, each of the AV storlets 460 optionally have access to a centralized antivirus definitional repository 520 within the cloud storage location 506. The antivirus definitional repository may be physically or logically located within the storage server 440, or another logical and/or physical location within the cloud storage location 506 as shown in the instant depiction.

Figure 6:
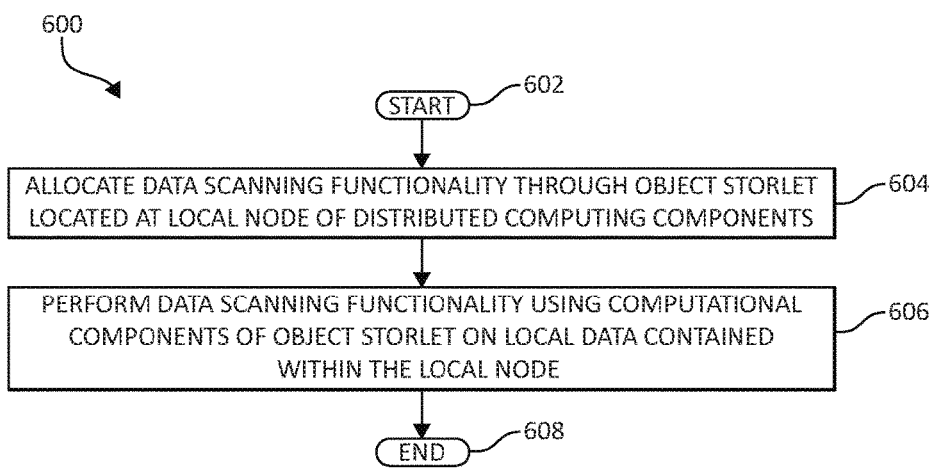
FIG. 6 is a flow chart diagram illustrating an exemplary method for scanning data within and between distributed computing components by a processor, again in which aspects of the present invention may be implemented.

With the foregoing in view, FIG. 6, following, is a flow chart diagram of an exemplary method 600 for data scanning, in which various aspects of the present invention may be implemented. Method 600 begins (step 602) with the allocation of data scanning functionality through an object storlet located at a local node of the distributed computing components (step 604).

In a following step, data scanning functionality (e.g., antivirus or anti-malware scanning operations) are performed using computational components of the object storlet on local data contained within the local node (step 606). The scanning functionality performed by the local storlet alleviates transfer, replication, or other data movement operations of the data to another location outside of the local node in the distributed computing environment. The method 600 then ends (step 608).

In one embodiment, each data object may have one or more associated metadata tags that may list information such as virus definition version, time of last scan, and antivirus software manufacturer, among other possible metadata information. A situation where more than one metadata tag is associated with a particular data object would present in a specialized occurrence, such as when multiple antivirus software vendors are being utilized for all objects. With the foregoing in mind, consider the following example of data processing of a typical data object according to various mechanisms of the present invention; in this case featuring antivirus scanning functionality.

As a first step in the example, the data object undergoes the initial PUT or update into the distributed computing environment (e.g., cloud system). If the applicable virus definitional information has changed since the last data scan (for the given virus software vendor) of the object, the object is scanned using updated definitions before the object is returned to the requesting entity.

If the object is replicated from one local node (e.g., one cloud storage location) to another, the object is then received by the new local node at a particular storage location, and therefore has access to the AV storlet, which performs antivirus scanning operations on the object. If the virus definitions have changed since the last scan time (again, for the given software vendor) according to the metadata tag associated with the object, the object is scanned as part of storing the object on the given local node's storage server. If, for example, a virus is found to be contaminated within the data object, all replicated copies of the object (in the local node and/or elsewhere in the distributed computing environment) may be tagged as being infected.

In the context of the present example, each AV storlet within the environment may receive specified configuration parameters, which define what actions to take if a particular object is infected. In addition, these configuration parameters may specify how the particular data object is treated within a given data storage location/local node. Because different storage locations are typically geographically dispersed, there may be differing rules for processing infected objects for each cloud storage location. Therefore, this configuration option of what to do with an infected object may, in one embodiment, be set independently at each cloud storage location.

Because of their distributed nature (multiple cloud storage locations), one cloud storage location may choose to quarantine the object and not allow access to the object. Another cloud storage location may choose to attempt to clean the object, and if the cleaning operation is unsuccessful, delete the object. Another alternative includes deletion of the infected object, if the regulations at the cloud storage location require such stringent controls.

With the possibility for one cloud storage location to remove the infected object, and another to possibly quarantine it, an inconsistent state of the object within all replica sites may be obtained. Therefore, one possible recommended solution may require that the strictest configuration for processing infected objects from among all cloud storage locations is used in all cloud storage locations. Other settings and configurations may also be used in a particular situation.

Figure 7:
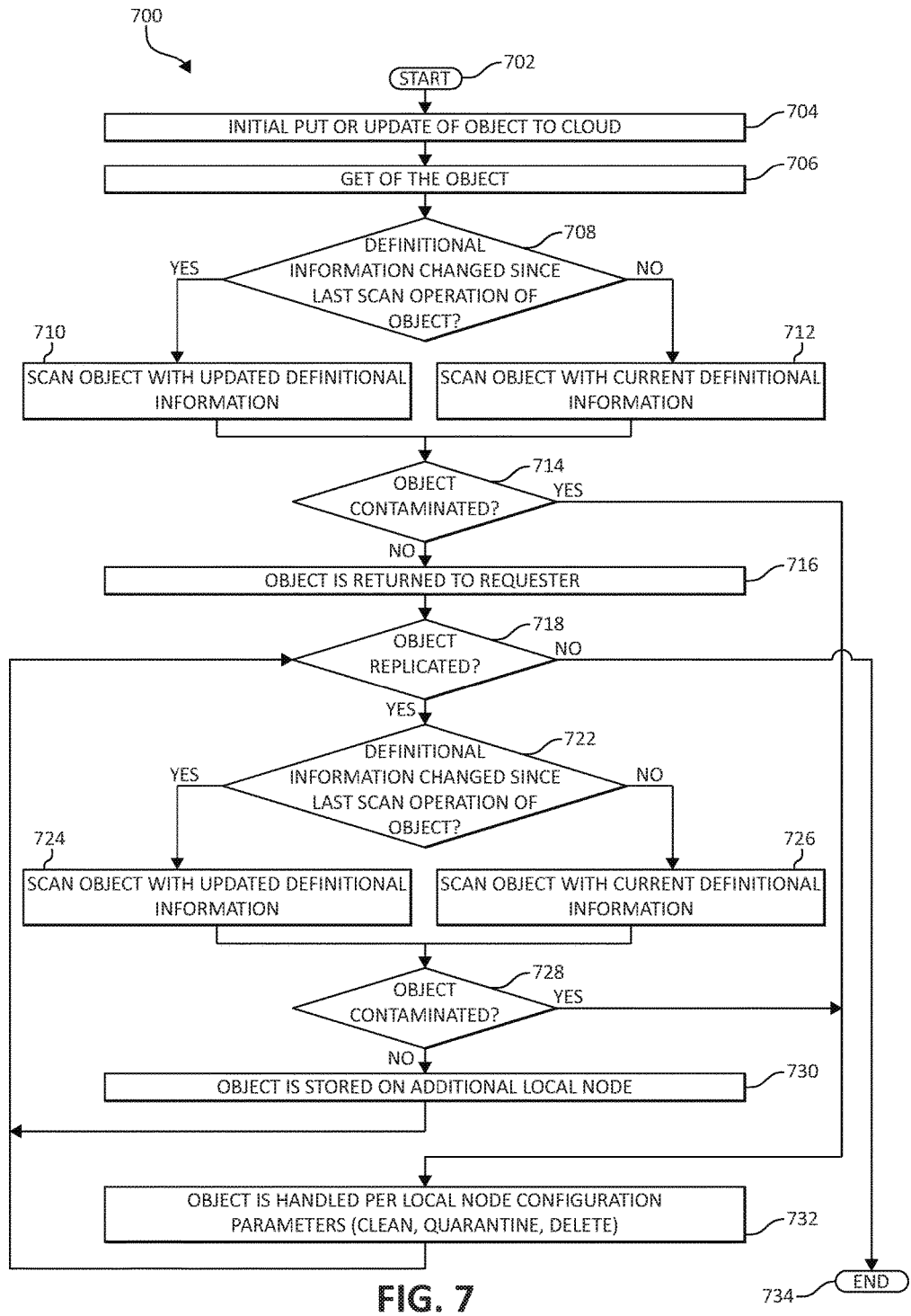
FIG. 7 is an additional flow chart diagram illustrating an exemplary method for scanning data within and between distributed computing components by a processor, again in which aspects of the present invention may be implemented.

Turning now to FIG. 7, an additional flow chart depicts an exemplary method 700 for scanning data in a distributed computing environment, here again in which various aspects of the present invention may be implemented.

Method 700 begins (step 702), with the initial PUT or update of a particular data object to the cloud (step 704) in conjunction with the initial GET of the object by the proxy server/storage server to which the object is then assigned in the cloud (step 706).

If the applicable virus definitional information has changed since the last data scan (for the given virus software vendor) of the object (step 708), the object is scanned using updated definitions (step 710). Alternatively, returning to step 708, if the definitional information is not changed, the object is scanned with the current definitional information (step 712). If the object is found not to be contaminated (step 714), the method moves to step 716, where the object is returned to the requester. Alternatively, if the object is found to be contaminated, the method 700 moves to step 732 to initiate data security protocols per the local storage node's configuration. This may include previously mentioned security measures such as deletion, quarantine, data movement, cleaning and other operations that are consistent with the local node's configuration.

Returning to step 716, the method 700 moves to step 718, which queries if the object is being replicated. If no, the method 700 then ends (step 734). If the object is being replicated, the method 700 moves to step 722, in which the local node receiving the object to be replicated queries if the definitional information has changed since the last scan operation of the object.

If the applicable virus definitional information has changed since the last data scan (for the given virus software vendor) of the object (again, step 722), the object is scanned using updated definitions (step 724). Alternatively, returning to step 722, if the definitional information is not changed, the object is scanned with the current definitional information (step 726). If the object is found not to be contaminated (step 728), the method moves to step 730, where the object is stored on the additional local node. The method 700 then returns to step 718, which again queries if an additional instance of replication is seen for the particular data object. Returning to step 728, alternatively, if the object is found to be contaminated, the method 700 moves to step 732 to initiate data security protocols per the local storage node's configuration (clean, quarantine, delete) as previously indicated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for scanning data within and between distributed computing components by a processor, comprising:
   allocating data scanning functionality through an object storlet located at a local node of the distributed computing components, the local node comprising a storage controller of a cloud-based data storage system storing the data locally to local node of the distributed computing components and remotely from a client to which the data belongs; wherein the storage controller controls input/output (I/O) operations transacted between the cloud-based data storage system and the client;
   performing the data scanning functionality using computational components of the object storlet on local data contained within the local node in response to the client uploading a data object comprising the local data to the local node using a PUT command, to alleviate transfer of the local data outside of the local node to be scanned; wherein the data object of the local data is associated with a metadata tag, and the metadata tag is initialized with definitional information to be used by the data scanning functionality, the metadata tag further holding information associated with the data object including at least a virus definition version, a time of last scan, and an antivirus software manufacturer; and during a data replication operation in which a previous data scanning operation has been performed prior to initiating the replication operation, examining the definitional information associated with the data object to be replicated from a source to a destination in the distributed computing components to determine if the definitional information is current, the definitional information including at least antivirus definitions or anti-malware definitions, wherein if the definitional information has changed from the previous data scanning operation, a new data scanning operation is performed previous to storing the data object in the destination thereby reducing associated storage space and I/O traffic needed to respectively store and transmit the definitional information.

2. The method of claim 1, wherein performing the data scanning functionality includes performing an antivirus scanning operation.

3. The method of claim 1, wherein performing the data scanning functionality includes performing an anti-malware scanning operation.

4. The method of claim 1, further including sharing a common set of definitions between the object storlet in the local node and an additional object storlet in an additional local node.

5. A system for scanning data within and between distributed computing components, comprising:

a processor, integrated into one of the distributed computing components, that:

allocates data scanning functionality through an object storlet located at a local node of the distributed computing components, the local node comprising a storage controller of a cloud-based data storage system storing the data locally to local node of the distributed computing components and remotely from a client to which the data belongs; wherein the storage controller controls input/output (I/O) operations transacted between the cloud-based data storage system and the client, performs the data scanning functionality using computational components of the object storlet on local data contained within the local node in response to the client uploading a data object comprising the local data to the local node using a PUT command, to alleviate transfer of the local data outside of the local node to be scanned; wherein the data object of the local data is associated with a metadata tag, and the metadata tag is initialized with definitional information to be used by the data scanning functionality, the metadata tag further holding information associated with the data object including at least a virus definition version, a time of last scan, and an antivirus software manufacturer, and during a data replication operation in which a previous data scanning operation has been performed prior to initiating the replication operation, examines the definitional information associated with the data object to be replicated from a source to a destination in the distributed computing components to determine if the definitional information is current, the definitional information including at least antivirus definitions or anti-malware definitions, wherein if the definitional information has changed from the previous data scanning operation, a new data scanning operation is performed previous to storing the data object in the destination thereby reducing associated storage space and I/O traffic needed to respectively store and transmit the definitional information.

6. The system of claim 5, wherein the processor, pursuant to performing the data scanning functionality, performs an antivirus scanning operation.

7. The system of claim 5, wherein the processor, pursuant to performing the data scanning functionality, performs an anti-malware scanning operation.

8. The system of claim 5, wherein the processor shares a common set of definitions between the object storlet in the local node and an additional object storlet in an additional local node.

9. A computer program product for scanning data within and between distributed computing components by a processor, the computer program product comprising a non-transitory computer-readable storage medium having computer-readable program code portions stored therein, the computer-readable program code portions comprising:

a first executable portion that:

allocates data scanning functionality through an object storlet located at a local node of the distributed computing components, the local node comprising a storage controller of a cloud-based data storage system storing the data locally to local node of the distributed computing components and remotely from a client to which the data belongs; wherein the storage controller controls input/output (I/O) operations transacted between the cloud-based data storage system and the client, performs the data scanning functionality using computational components of the object storlet on local data contained within the local node in response to the client uploading a data object comprising the local data to the local node using a PUT command, to alleviate transfer of the local data outside of the local node to be scanned; wherein the data object of the local data is associated with a metadata tag, and the metadata tag is initialized with definitional information to be used by the data scanning functionality, the metadata tag further holding information associated with the data object including at least a virus definition version, a time of last scan, and an antivirus software manufacturer, and during a data replication operation in which a previous data scanning operation has been performed prior to initiating the replication operation, examines the definitional information associated with the data object to be replicated from a source to a destination in the distributed computing components to determine if the definitional information is current, the definitional information including at least antivirus definitions or anti-malware definitions, wherein if the definitional information has changed from the previous data scanning operation, a new data scanning operation is performed previous to storing the data object in the destination thereby reducing associated storage space and I/O traffic needed to respectively store and transmit the definitional information.

10. The computer program product of claim 9, further including a second executable portion that, pursuant to performing the data scanning functionality, performs an antivirus scanning operation.

11. The computer program product of claim 9, further including a second executable portion that, pursuant to performing the data scanning functionality, performs an anti-malware scanning operation.

12. The computer program product of claim 9, further including a second executable portion that shares a common set of definitions between the object storlet in the local node and an additional object storlet in an additional local node.

\* \* \* \* \*